US005222149A

United States Patent [19]

Palmer

[11] Patent Number: 5,222,149

[45] Date of Patent: Jun. 22, 1993

[54] DAMPING TERMINATOR FOR HIGH FIDELITY AUDIO SIGNALS

[76] Inventor: Donald E. Palmer, 1275 Vicente Dr., Sunnyvale, Calif. 94086

[21] Appl. No.: 792,841

[22] Filed: Nov. 15, 1991

[51] Int. Cl.[5] .......... H04B 3/00

[52] U.S. Cl. .......... 381/94; 351/77

[58] Field of Search .......... 336/73, 84 C, 229, 174, 336/175; 381/77, 94; 174/32, 34, 105 R

[56] References Cited

U.S. PATENT DOCUMENTS 4,543,554 9/1985 Muellenheim et al. .......... 336/229
4,885,555 12/1989 Palmer .......... 333/12
5,083,101 1/1992 Frederick .......... 336/229

*Primary Examiner*—Forester W. Isen
*Attorney, Agent, or Firm*—Townsend and Townsend Khourie and Crew

[57] ABSTRACT

In audio frequency high fidelity equipment, termination plugs for input ports and output ports of various types wherein the termination plugs include a conductive-film-covered ferromagnetic-core electrical damping element inductively coupled to potential signal carrying components. In an unbalanced configuration, an RCA-type plug may include a shorting loop between the center conductor and the shield wherein a loop or coil of conductively-clad ferromagnetic material is disposed around the shorting conductor forming a transformer circuit, the cladding being a shorted secondary. The cladding is a film of copper, gold or silver, which is preferably covered with electrical insulation. In a an embodiment for an output terminator plug for an RCA-type jack, the RCA-type plug includes an impedance matching load between the center conductor and the shell, the impedance matching load element being electrically coupled with a loop or coil of the cladded ferromagnetic material disposed around the impedance matching load element. In a still further embodiment, a balanced signal line connector may include a ferromagnetic loop or coil, appropriately clad in copper and insulated, wherein the loop is disposed to surround the entire shell portion, thereby enclosing both the shell and the balanced signal carrying lines. The signal carrying lines are preferably connected to ground through the shell and have in line a matched impedance load.

9 Claims, 3 Drawing Sheets

DAMPING TERMINATOR FOR HIGH FIDELITY AUDIO SIGNALS

BACKGROUND OF THE INVENTION

This invention relates to audio high fidelity apparatus and more particularly to terminators for input and output connectors of audio high fidelity apparatus.

It has been discovered that unterminated input and output ports of audio high fidelity equipment are sources of undesired noise. Noise is believed to be as a result of undesired input common-mode or differential signals due to the lack of a proper load at a signal output and due to high impedance or lack of a signal short to ground at input terminals.

A direct short to ground at an input terminal is an ideal termination. Unfortunately, there is typically a length of some significance between a chassis connection and the input to the first circuit element such that a receiving antenna and detector or the like is created for spurious signals. A similar problem is evident in the signal line from an output terminal of a circuit to an output jack on the chassis of the equipment. The problem is aggravated where the output port of a circuit is coupled to multiple output jacks in parallel. Some of the output jacks may be properly loaded while others are not, giving rise to open circuit signal reflections which can cause undesired oscillations ("ringing") in the signal lines due to transmission line effects. The distortion may be further aggravated by negative feedback loops between the output terminals wherein the spurious signals are present and thereby coupled into the input through the feedback signal lines.

What is needed is a mechanism for minimizing the undesired effects caused by improperly terminated input and output ports in an audio high fidelity circuit.

It is known to provide impedance matched terminations at the outputs of driving circuitry, particularly in high frequency equipment where impedance matching, is of critical concern. Nevertheless, it has been discovered that impedance matching is important even at low frequencies in relatively long wave or audio frequency signal applications. Not commonly recognized in the audio high fidelity arts has been the benefit of rf suppression in addition to the benefit of proper impedance matching.

SUMMARY OF THE INVENTION

According to the invention, in audio frequency high fidelity equipment, termination plugs for input ports and output ports of various types wherein the termination plugs include a conductive-film-covered ferromagnetic-core electrical damping element inductively coupled to potential signal carrying components. In an unbalanced configuration, an RCA-type plug may include a shorting loop between the center conductor and the shield wherein a loop or coil of conductively-clad ferromagnetic material is disposed around the shorting conductor forming a transformer circuit, the cladding being a shorted secondary. The cladding is a film of copper, gold or silver, which is preferably covered with electrical insulation. In a an embodiment for an output terminator plug for an RCA-type jack, the RCA-type plug includes an impedance matching load between the center conductor and the shell, the impedance matching load element being electrically coupled with a loop or coil of the cladded ferromagnetic material disposed around the impedance matching load element. In a still further embodiment, a balanced signal line connector may include a ferromagnetic loop or coil, appropriately clad in copper and insulated, wherein the loop is disposed to surround the entire shell portion, thereby enclosing both the shell and the balanced signal carrying lines. The signal carrying lines are preferably connected to ground through the shell and have in line a matched impedance load.

Various combinations of ferromagnetic loops with loading elements and insulated clad ferromagnetic loops are contemplated according to the invention. The clad magnetic loop promotes the suppression of undesired oscillations in signal-carrying lines which might otherwise result from transmission line effects in shorted or loaded input and output circuits.

The invention will be better understood by reference to the following detail description in connection with the company drawings.

DESCRIPTION OF PREFERRED EMBODIMENTS

Figure 1:
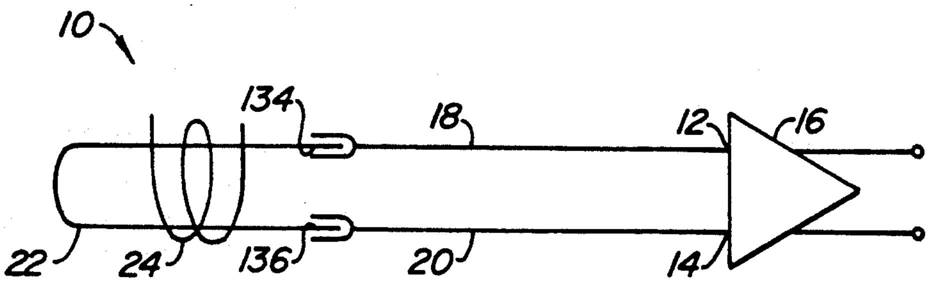
FIG. 1 is a diagram of a balanced input circuit with a ferromagnetic loop in a termination according to the invention.
Figure 7:
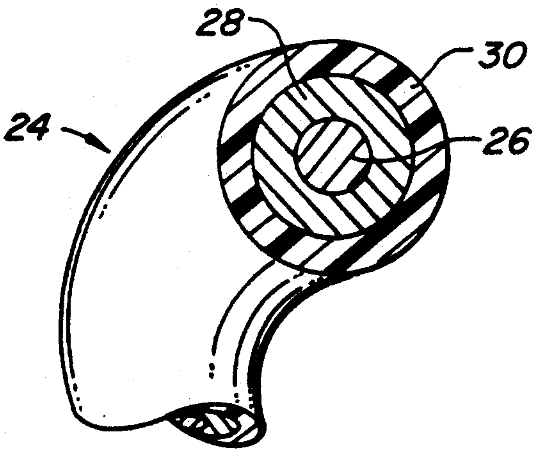
FIG. 7 is a perspective view in partial cross section of a ferromagnetic element illustrating the structure of the ferromagnetic element according to the invention.

Referring to FIG. 1, there is shown a schematic of an input termination 10 for the balanced input ports 12, 14 of an amplifier 16. This is a temporary connection for conditions where that particular input port is not in use. The conductors 18, 20 and the internal shorting conductor 22 comprise a length which is not insignificant. In accordance with the invention, and referring to FIG. 7, each termination is inductively coupled with a complex wire 24 having a ferromagnetic core 26 which has a highly electrically-conductive coating 28 forming a secondary of a transformer, the entire complex wire structure being preferably covered with insulation 30 to electrically isolate the complex wire 24 from the conductor 22. The conductive coating 28 forms a short circuit along the minimum distance around the core 26, namely, the circumference of the core 26, such that the conductive coating serves as a shorted secondary of a transformer. The ferromagnetic core is preferably ferrite or other iron-containing material. The core may in fact be pure iron. The complex wire 24 is formed in a helix around the signal path. Inductively coupled to an input circuit, this arrangement has been found to suppress spurious noise at the input ports of the input circuit of an amplifier. Standard RCA-type or other signal carrying couplings 134, 136 removably connect the termination 10 to the input ports 12, 14, respectively.

Figure 2:
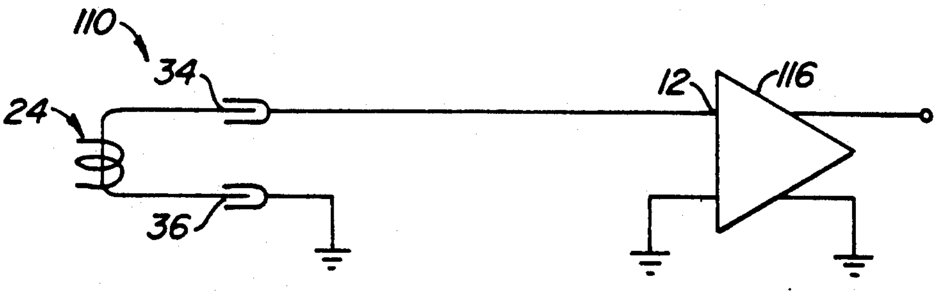
FIG. 2 is a diagram of an unbalanced input circuit having a ferromagnetic loop in parallel with a signal short between unbalanced terminals.

Various configurations have been found to be useful. Referring to FIG. 2, an unbalanced amplifier 116 with an input port 12 is terminated by a short circuit terminator 110 wherein the complex wire 24 encircles only one part of the signal-carrying path, preferably in a helix.

Figure 3:
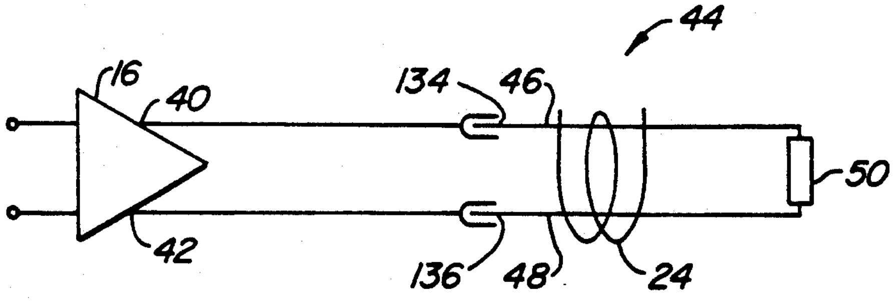
FIG. 3 is a diagram of a balanced output termination having ferromagnetic element surrounding both signal carrying lines together according to the invention.

FIG. 3 illustrates an amplifier 16 having balanced outputs 40, 42 coupled to a terminating load 44 according to one embodiment of the invention. A load element 50 removably coupled through connectors 134, 136 by leads 46, 48 between the balanced outputs 40, 42 is of an impedance which is matched to the impedance of the balanced outputs 40, 42. According to the invention, the complex wire 24 encircles the signal-carrying path of both of the leads 46 and 48.

Figure 4:
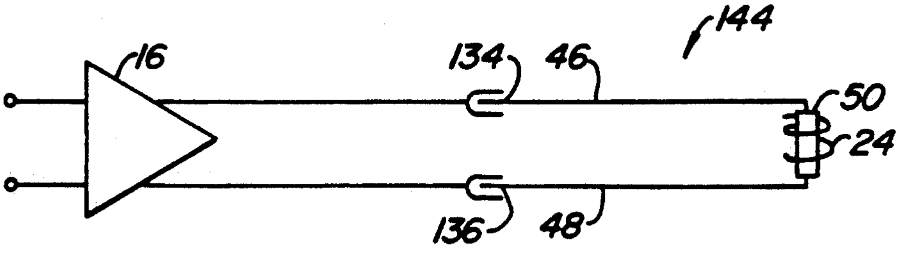
FIG. 4 is a diagram of a balanced output circuit having a ferromagnetic element coupled in parallel with an impedance-matching load according to the invention.

FIG. 4 illustrates an amplifier 16 having balanced outputs 40, 42 coupled via connectors 134, 136 to a terminating load 144 according to another embodiment of the invention. Load element 50 is coupled by leads 46, 48 between the balanced outputs 40, 42 and is of an impedance which is matched to the impedance of the balanced outputs 40, 42. According to the invention, the complex wire 24 encircles the signal-carrying path only at the load element 50.

Figure 10:
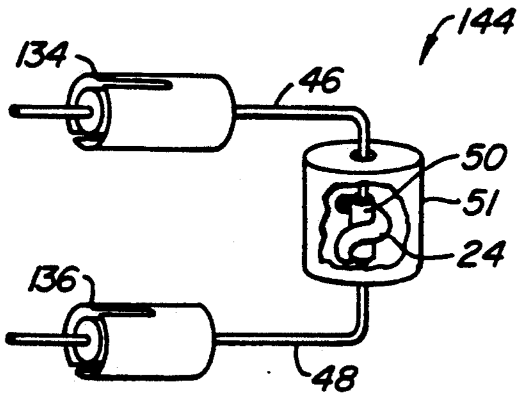
FIG. 10 shows one structure of a terminating load of the type shown in FIG. 4.

FIG. 10 is an illustration of one structure of a terminating load 144 of the type described in connection with FIG. 4. RCA connectors 134, 136 connect to leads 46, 48 of load element 50 about which is wound complex wire 24. A casing 51 may optionally enclosed the load element 50 and the wire 24.

Figure 5:
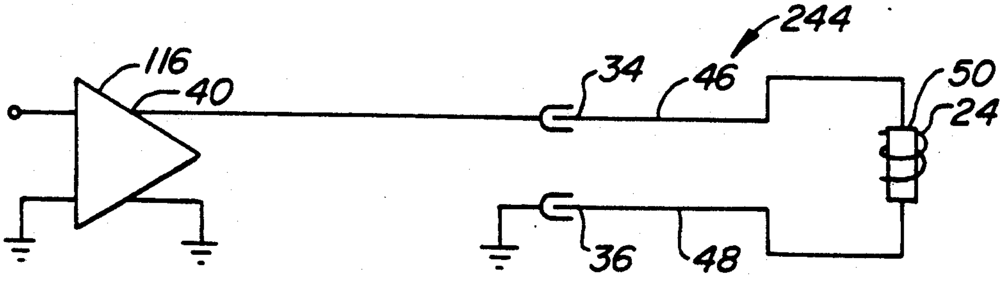
FIG. 5 is a diagram of an output circuit with an unbalanced load having a ferromagnetic element coupled in parallel with the impedance matching load element according to the invention.

Referring to FIG. 5, an unbalanced amplifier 116 with an output port 40 is terminated by an impedance-matched circuit terminator 244 wherein the complex wire 24 encircles the signal-carrying path, preferably in a helix, at only one point, preferably at the impedance-matched load element 50.

Figure 8:
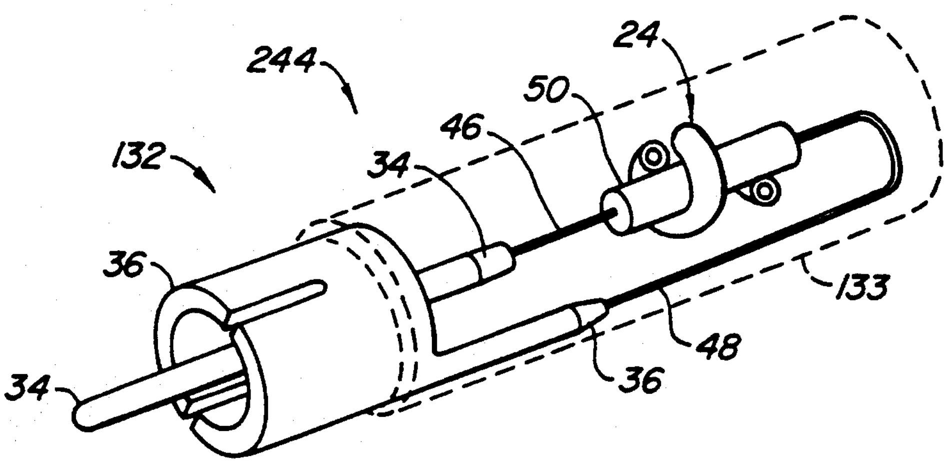
FIG. 8 is a perspective view of illustrating possible structures for an input termination element or an output termination element of the type diagrammatically shown in FIGS. 2 and 5.

FIG. 8 represents a perspective view of the terminator 244. An RCA-type jack 132 includes a center conductor 34 and ground 36 between which is coupled a terminating load 50 through leads 46 and 48. The complex wire 24 is wound around the terminating load 50. The output terminator 244 may be of the same form factor as an input terminator 110 (FIG. 2) which does not have a load element 50.

Figure 6:
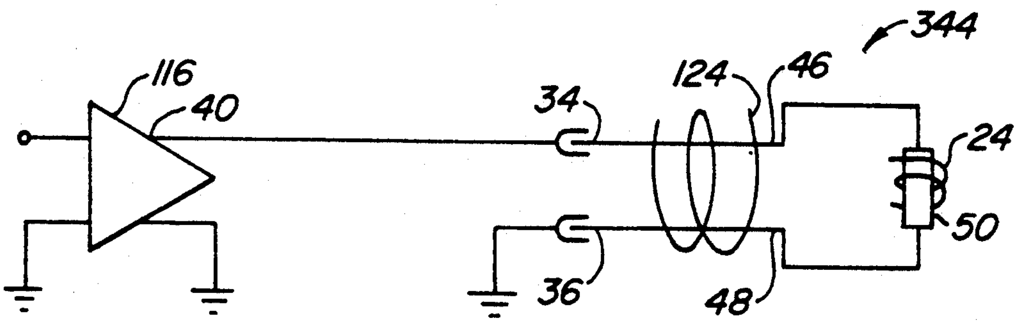
FIG. 6 is a diagram of an unbalanced output circuit with a combination of ferromagnetic elements according to the invention.

Referring to FIG. 6, an unbalanced amplifier 116 with output port 40 is terminated by impedance-matched circuit terminator 344 wherein a first complex wire 24 encircles the signal-carrying path, preferably in a helix, preferably at the impedance-matched load element 50, and wherein a second complex wire 124 encircles the signal-carrying path at least at two locations, as around paths 46 and 48, adjacent the terminals 34 and 36.

Figure 9:
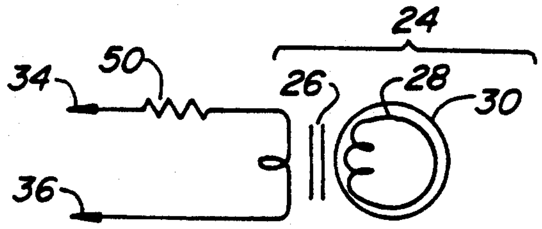
FIG. 9 is a schematic diagram of a typical terminator according to the invention.

FIG. 9 is a schematic diagram of a typical terminator according to the invention. There are two terminals 34 and 36 on a primary loop, which may be a shorting loop or an impedance-matched loop (as loaded by load element 50). The ferrite material 26 of the complex wire 24 is a transformer core, with the conductive coating 28 forming a shorted secondary, all surrounded by insulation 30. The shorted secondary promotes in this circuit enhances the suppression of spurious current flow.

The invention has now been explained with reference to specific embodiments. Other embodiments will be apparent to those of ordinary skill in the art. Accordingly, it is not intended that the invention be limited, except as indicated by the appended claims.

What is claimed is:

1. A termination device for connecting terminals of a single signal interface of a high fidelity audio signal circuit apparatus for suppressing spurious current flow comprising:

at least one means of ferromagnetic material surrounding at least one signal carrying element of said termination device, said at least one signal carrying element connecting two terminals of said single signal interface; and secondary circuit means, said secondary circuit means being a highly electrically conductive coating disposed upon said ferromagnetic material means and forming a short circuit about said ferromagnetic material means.

2. The device according to claim 1 wherein said ferromagnetic material means is a helix containing iron.

3. The device according to claim 1 wherein said ferromagnetic material means is iron and said secondary circuit means is a coating at least as electrically conductive as copper.

4. The device according to claim 1 further including insulating means encasing said secondary circuit means and said ferromagnetic material means for insulation from said signal carrying elements.

5. The device according to claim 1 wherein said secondary circuit means is disposed around first and second nonactive signal carrying elements of dual conductors of said termination device.

6. A termination device for connecting terminals of a single signal inerface of a high fidelity audio signal circuit apparatus for suppressing spurious current flow comprising:

at least one means of ferromagnetic material surrounding at least one signal carrying element of said termination device, said at least one signal carrying element connecting two terminals of said single signal interface; and secondary circuit means, said secondary circuit means being a highly electrically conductive coating disposed upon said ferromagnetic material means and forming a short circuit about said ferromagnetic material means, wherein said secondary circuit means is disposed to surround only a single signal carrying conductor between terminals of said termination device.

7. The device according to claim 1 wherein said secondary circuit means is disposed to surround an impedance matching device which is coupled between terminals of said termination device.

8. The device according to claim 1 wherein said secondary circuit means is disposed to surround first and second signal carrying lines of said termination device and wherein said termination device includes an impedance matching element coupled between terminals of said termination device through said first and second signal carrying lines for coupling to a balanced circuit.

9. A termination device for a signal interface of a high fidelity audio signal circuit apparatus for suppressing spurious current flow comprising:

a first means of ferromagnetic material surrounding at least two signal carrying elements of said termination device;

a first secondary circuit means, said first secondary circuit means being a highly electrically conductive coating disposed upon said first ferromagnetic means and forming a short circuit about said ferromagnetic material means;

a second means of ferromagnetic material surrounding a single signal carrying element of said termination device; and a second secondary circuit means, said second secondary circuit means being a highly electrically conductive coating disposed upon said second ferromagnetic means and forming a short circuit about said second ferromagnetic material means.

* * * * *